F. HARDINGE.
CROSS SLIDE MECHANISM FOR LATHES.
APPLICATION FILED SEPT. 4, 1917.
1,290,550.
Patented Jan. 7, 1919.
2 SHEETS—SHEET 1.
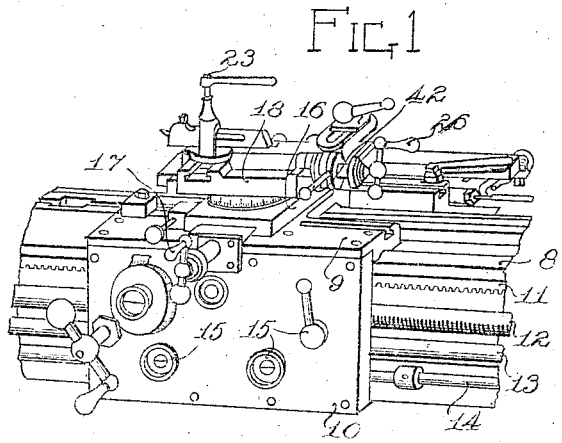
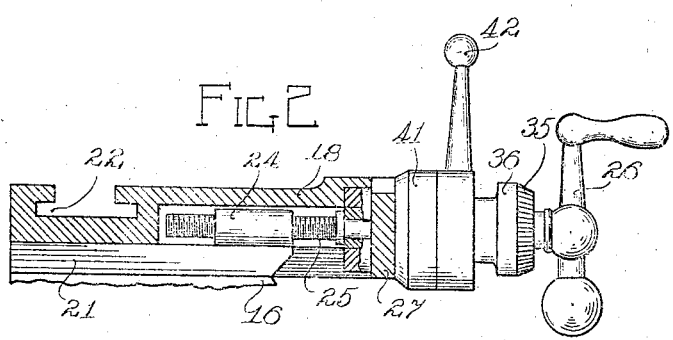
WITNESSES:
Andrew Kintnecott
Robert F. Bracke
INVENTOR
FRANKLIN HARDINGE
BY Williams Bradbury &c
ATTORNEYS

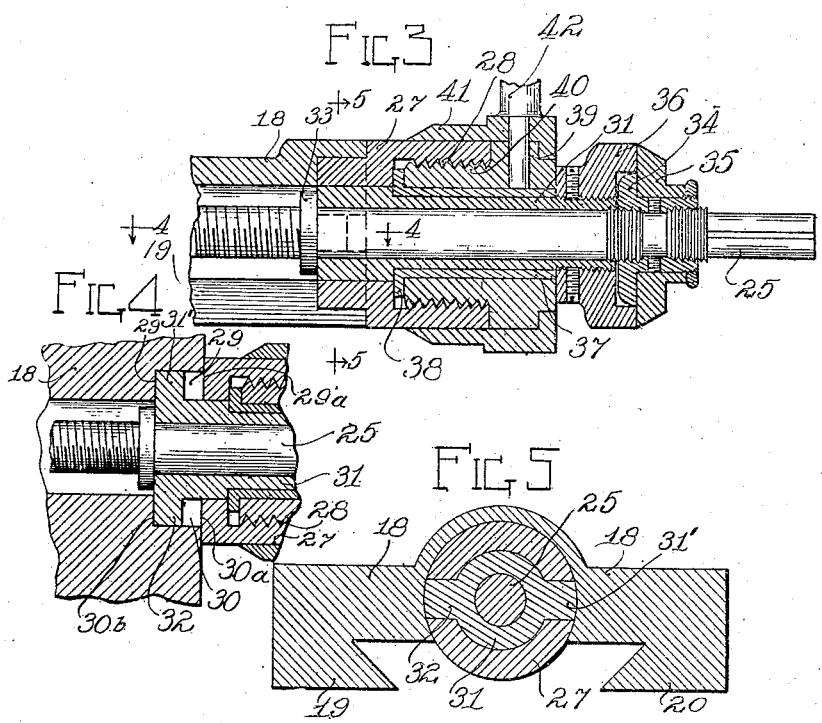

UNITED STATES PATENT OFFICE.

FRANKLIN HARDINGE, OF CHICAGO, ILLINOIS, ASSIGNOR TO HARDINGE BROTHERS, OF CHICAGO, ILLINOIS, A CORPORATION OF ILLINOIS.

CROSS-SLIDE MECHANISM FOR LATHES.

1,290,550. Specification of Letters Patent. Patented Jan. 7, 1919.

Original application filed January 28, 1915, Serial No. 4,841. Divided and this application filed September 4, 1917. Serial No. 189,501.

*To all whom it may concern:*

Be it known that I, FRANKLIN HARDINGE, a citizen of the United States, residing at Chicago, in the county of Cook and State of Illinois, have invented a certain new and useful Improvement in Cross-Slide Mechanism for Lathes, of which the following is a full, clear, concise, and exact description, reference being had to the accompanying drawings, forming a part of this specification.

My invention relates to cross slide mechanism for metal working machines, and particularly for lathes, and has for its object the provision of simple and effective means for shifting the cross slide independently of its adjusting mechanism, whereby it is possible to operate the slide so that the same may be retracted from its advance position and then returned to the latter without in any way affecting the previously made adjustment of the slide. I am aware of the fact that devices of this general character have been employed in the past, but such mechanism has been either too complicated for practical use or has been ineffective in its operation.

The present application is a division of my co-pending application Serial No. 4841, filed January 28, 1915, covering improvements in lathes.

The device of the present invention is such that it may be adapted to either a cross slide or to a compound cross slide, and in the accompanying drawings I have shown it in connection with a compound cross slide. Generally the device consists of a support and a cross slide mounted for reciprocation on the support. The support carries a nut having threaded engagement with a screw carried by the cross slide. The mechanism for causing movement of the cross slide independently of the screw and nut is interposed between the screw and the cross slide, so that the cross slide may be moved relatively to its support and relatively to the nut and screw mechanism. This feature, so far as I am aware, is broadly new, since it has been the practice to move the entire screw and nut mechanism when the so-called independent advance of the cross slide mechanism is operated.

These and other objects of the present invention will be pointed out in detail in connection with the accompanying drawings, wherein—

Figure 1 is a fragmentary perspective view of the lathe, showing the cross slide and compound cross slide of the present invention.

Fig. 2 is a detail view partly in elevation and partly in section of the compound cross slide mechanism;

Fig. 3 is a vertical cross sectional view of the left-hand end of the compound cross slide mechanism shown in Fig. 2, the operating handle being removed in this figure;

Fig. 4 is a horizontal cross sectional view taken along the line 4—4 of Fig. 3, looking in the direction indicated by the arrows;

Fig. 5 is a vertical cross sectional view taken along the line 5—5 of Fig. 3, looking in the direction indicated by the arrows.

Similar characters of reference refer to similar parts throughout the several views.

Referring first to Fig. 1, 8 designates a lathe bed upon which is mounted for longitudinal movement a carriage 9 provided with an apron 10. The front side of the bed 8 supports the usual gear rack 11, lead screw 12, and feed rod 13. If desired an automatic stop rod may be employed at 14 for limiting the movement of the carriage 9 along the bed of the lathe. The apron 10 is provided with the usual mechanism shown at 15—15 for connecting the carriage with the lead screw or the feed rod. Mounted on the carriage 9 and arranged to have movement thereon transversely of the lathe is a cross slide 16 arranged to be operated by the handle shown at 17, or by the feed rod 13. The mechanism just referred to is common to all standard forms of lathes, and need not therefore be described in detail. It will suffice to say that the crank 17 is attached to a screw, in turn coöperating with a nut carried by the cross slide 16. Mounted for reciprocation on the cross slide 16 is a compound cross slide 18, the latter being provided with the guide members shown at 19 and 20 (Fig. 5) which coöperate with corresponding guide members, one of which is shown at 21 (Fig. 2), carried by the cross slide 16. The upper side of the compound cross line 18 is provided with a T-shaped groove 22 for the reception of a tool post shown at 23.

Fixed to the cross slide 16 and extending upwardly between the guides 19 and 20 of the compound cross slide is a nut 24 coöperating with a screw 25. This screw, as most clearly shown in Figs. 1 and 2, extends outwardly and is provided at its outer end with a crank 26.

Referring now to Figs. 3, 4, and 5, the compound cross slide 18 has its outer end fixed to a sleeve 27 provided with the internal threads shown at 28. The sleeve 27 contains the two slots shown at 29 and 30 in Fig. 4, which are disposed substantially diametrically opposite each other. Mounted within the sleeve 27 and around the screw 25 is a sleeve 31, whose inner end carries the two projections or lugs 31' and 32 extending into the slots 29 and 30 respectively of the sleeve 27. The width of the lugs 31' and 32 is somewhat less than the width of the slots 29 and 30, so that relative movement between the sleeve 31 and the sleeve 27 is permitted for the purpose to be pointed out presently. The sleeve 31 is loosely mounted upon the screw 25, so that the screw may be rotated relatively to the sleeve, but longitudinal movement of the sleeve relatively to the screw is prevented by a flange 33 carried by the screw 25 at one end of the sleeve 31, and a nut 34 screw-threaded on the screw 25 at the opposite end of the sleeve.

Attached to the nut 34 in any suitable manner is an index plate 35 provided with suitable indicia and coöperating with a nut 36 fixed to the sleeve 31 to enable the workman to determine the amount of rotation of the screw 25 relatively to the nut 36. Mounted around the sleeve 31 is a bushing 37 provided with a flange 38 at its inner end. Interposed between the flange 38 and the nut 36 and mounted around the bushing is a sleeve 39 provided with external threads 40 meshing with the threads 28 of the internally threaded sleeve 27. The sleeve 39 is attached to an outer sleeve 41 extending part way over the sleeve 27. A handle 42 is attached to the sleeves 39 and 41 in any suitable manner; for example, as shown in Fig. 3.

The operation of the device is as follows: In moving the tool carried by the tool post to a position such that it may operate upon the work mounted on the lathe, the handle 42 is first grasped and rotated in a direction such that the sleeve 27 and thus the compound cross slide 18 to which the sleeve is attached is moved forwardly away from the sleeve 39. Movement of the compound slide 18 and the sleeve 27 in this direction is limited by the shoulders 29$^a$ and 30$^a$ shown in Fig. 4. The crank 26 and thus the screw 25 is then rotated to set the tool to the desired position. If now, for any reason, it is desired to retract the tool without in any way interfering with the accurate and carefully made adjustment of the screw 25 and the nut 24, the handle 42 is grasped and the sleeve 39 rotated so that the sleeve 27 is moved toward the sleeve 39, the movement of the compound cross slide 18 being limited in this direction by the shoulders 29$^b$ and 30$^b$. After retracting the compound cross slide in this manner, the same may be again returned to its original position, and the exact position which it originally had, by simply manipulating the handle 42 to again cause movement of the compound cross slide away from the sleeve 39. Attention is directed to the fact that upon manipulation of the handle 42, the screw and nut mechanism 24 and 25 remains fixed, and that the cross slide is caused to move relatively to its support and to the nut and screw mechanism.

Having thus described my invention, what I claim as new and desire to secure by Letters Patent of the United States is:

1. Cross feed mechanism comprising a support, a cross slide mounted on the support, a nut carried by the support, a coöperating screw carried by the cross slide, and means for moving the cross slide relatively to the support and the said nut and screw mechanism, comprising two co-acting screw-threaded members, one of which is secured to said slide and the other of which is rotatably mounted upon said screw.

2. Compound cross feed mechanism comprising a support, a cross slide mounted on the support, a nut carried by the support, a coöperating screw carried by the cross slide, a threaded sleeve rotatably mounted on the screw and fixed against longitudinal movement relatively thereto, a second threaded sleeve coöperating with said first mentioned sleeve, and carried by the cross slide, and a handle secured to the first mentioned sleeve.

3. Compound cross feed mechanism comprising a support, a cross slide mounted on the support, a nut carried by the support, a coöperating screw carried by the cross slide, a threaded sleeve rotatably mounted on the screw and fixed against longitudinal movement relatively thereto, a second threaded sleeve coöperating with said first mentioned sleeve and carried by the cross slide, and positive stop means for limiting the movement between said sleeves in both directions.

4. Cross feed mechanism comprising a support, a cross slide mounted on the support, a nut carried by the support, a screw coöperating with the nut, a pair of coöperating threaded elements connecting the screw and cross slide, and means for rotating one of the elements relatively to the other to cause movement of the cross slide.

5. Cross feed mechanism comprising a support, a cross slide mounted on the support, a nut carried by the support, a screw coöperating with said nut, and a pair of interconnecting members connecting the screw and cross slide, and arranged to have relative longitudinal movement upon operation of one of said members.

6. A cross feed mechanism comprising a support provided with a nut, a cross slide mounted on said support and provided with an internally screw threaded extension co-axial with said nut, a screw co-acting with said nut and extending through said threaded extension, an externally threaded sleeve rotatably mounted on said screw and co-acting with said threaded extension, and means for preventing axial movement of said sleeve relative to said screw.

7. A cross feed mechanism comprising a support provided with a nut, a cross slide mounted on said support and provided with a screw threaded extension co-axial with said nut, a screw co-acting with said nut and extending through said threaded extension, a threaded sleeve rotatably mounted on said screw and co-acting with said threaded extension, and means for preventing axial movement of said sleeve relative to said screw.

In witness whereof, I hereunto subscribe my name this 29th day of August, 1917.

FRANKLIN HARDINGE.

Witnesses:
ROBERT F. BRACKE,
ANDREW WINTERCORN.

Copies of this patent may be obtained for five cents each, by addressing the "Commissioner of Patents. Washington, D. C."